US006339731B1

(12) United States Patent
Morris et al.

(10) Patent No.: US 6,339,731 B1
(45) Date of Patent: Jan. 15, 2002

(54) CONFIGURABLE VENDING MACHINE AUDIT MODULE

(75) Inventors: Matthew P. Morris, Exton; Patrick J. McGarry, West Chester, both of PA (US)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/390,120

(22) Filed: Sep. 3, 1999

(51) Int. Cl.[7] .................... G06F 17/00
(52) U.S. Cl. .................... 700/236; 700/241; 700/244
(58) Field of Search .................... 700/231, 236, 700/241, 244; 221/2; 235/385

(56) References Cited

U.S. PATENT DOCUMENTS

| | | | | | |
|---|---|---|---|---|---|
| 4,369,442 | A | * | 1/1983 | Werth et al. | 340/825.35 |
| 4,412,292 | A | | 10/1983 | Sedam et al. | 364/479 |
| 4,611,205 | A | | 9/1986 | Eglise | 340/825.35 |
| 5,091,713 | A | * | 2/1992 | Horne et al. | 340/541 |
| 5,337,253 | A | * | 8/1994 | Berkovsky et al. | 364/479 |
| 5,442,568 | A | | 8/1995 | Ostendorf et al. | 364/479 |
| 5,464,087 | A | * | 11/1995 | Bounds et al. | 194/200 |
| 5,608,643 | A | | 3/1997 | Wichter et al. | 364/479.14 |
| 5,787,149 | A | | 7/1998 | Yousefi et al. | 455/422 |
| 5,959,869 | A | * | 9/1999 | Miller et al. | 364/479.01 |
| 6,038,491 | A | * | 3/2000 | McGarry et al. | 700/231 |

FOREIGN PATENT DOCUMENTS

| | | |
|---|---|---|
| EP | 0 817 138 A1 | 1/1998 |

* cited by examiner

*Primary Examiner*—Christopher P. Ellis
*Assistant Examiner*—Khoi H. Tran
(74) *Attorney, Agent, or Firm*—Fish & Richardson P.C.

(57) ABSTRACT

A method of auditing data from a vending machine includes providing commands to an audit module installed in the vending machine. The commands indicate a type of vending machine data to be processed by the audit module, how the data is to be processed by the audit module, and a location in memory in the audit module for storage of that type of vending machine data. The audit module is configured to process vending machine data in response to the received commands. Monitored vending machine data can be reported to a remote host in a manner specified by one or commands sent to the audit module.

25 Claims, 13 Drawing Sheets

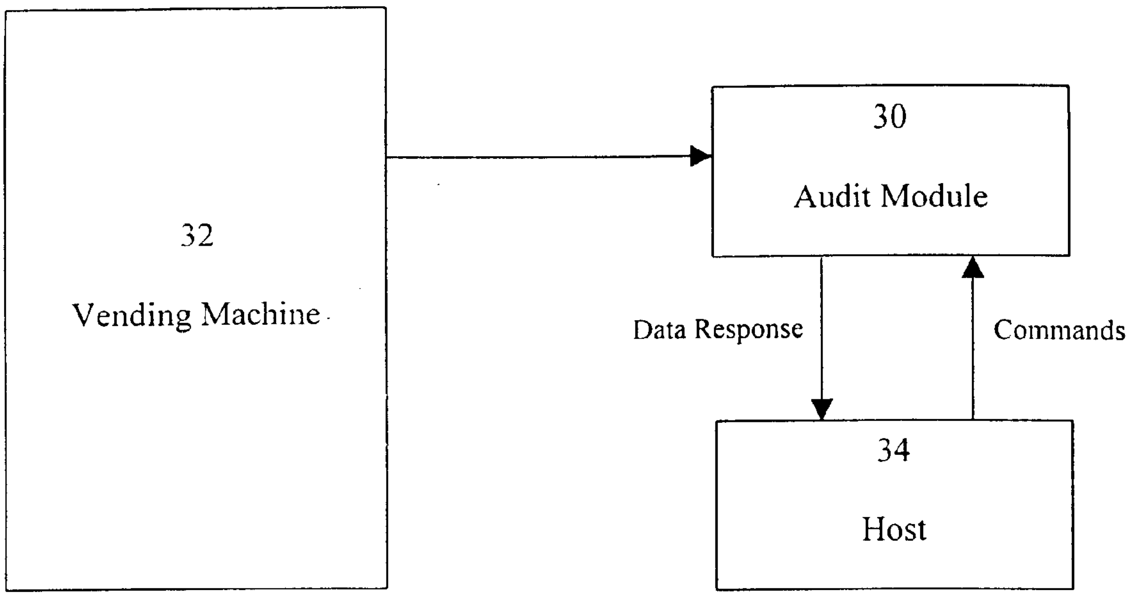
Figure 1 : Audit Module Installation

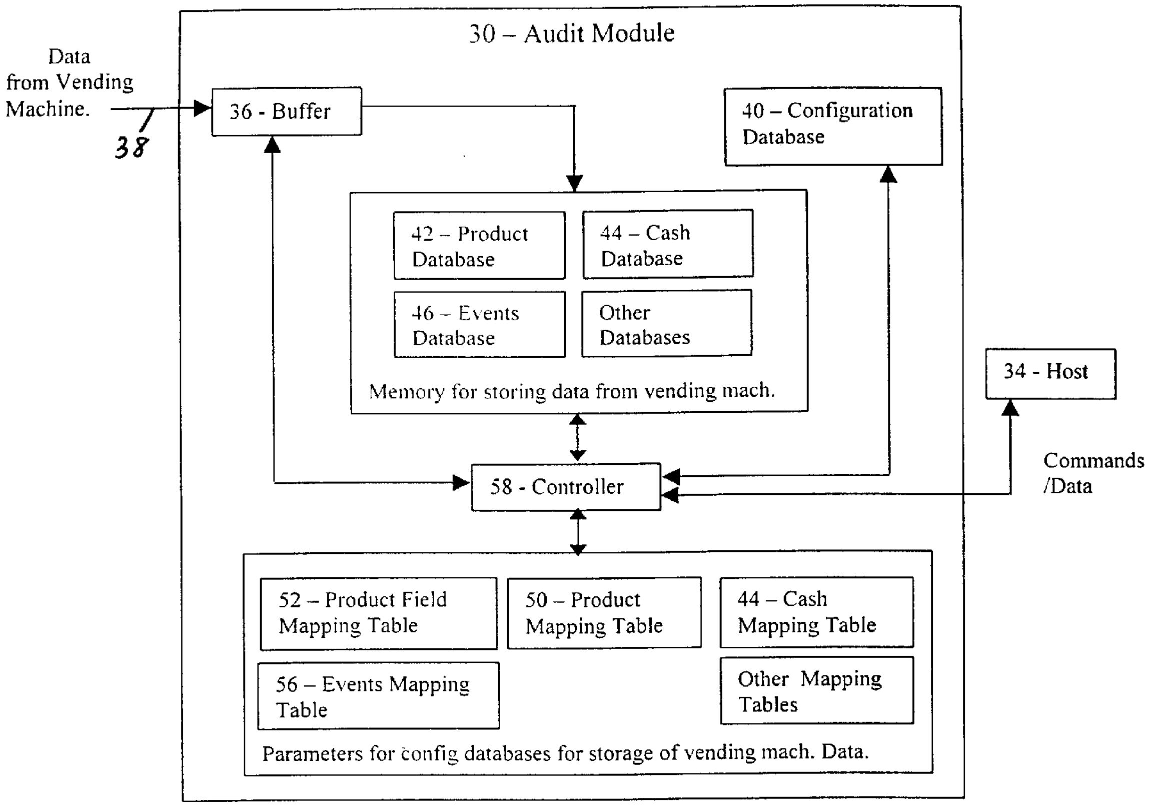
Figure 2 : Audit Module Configuration

| | | | |
|---|---|---|---|
| Table Index (n) | Block ID (ID) | Field (f) | Action to be taken. |
Figure 3A : General Mapping Structure
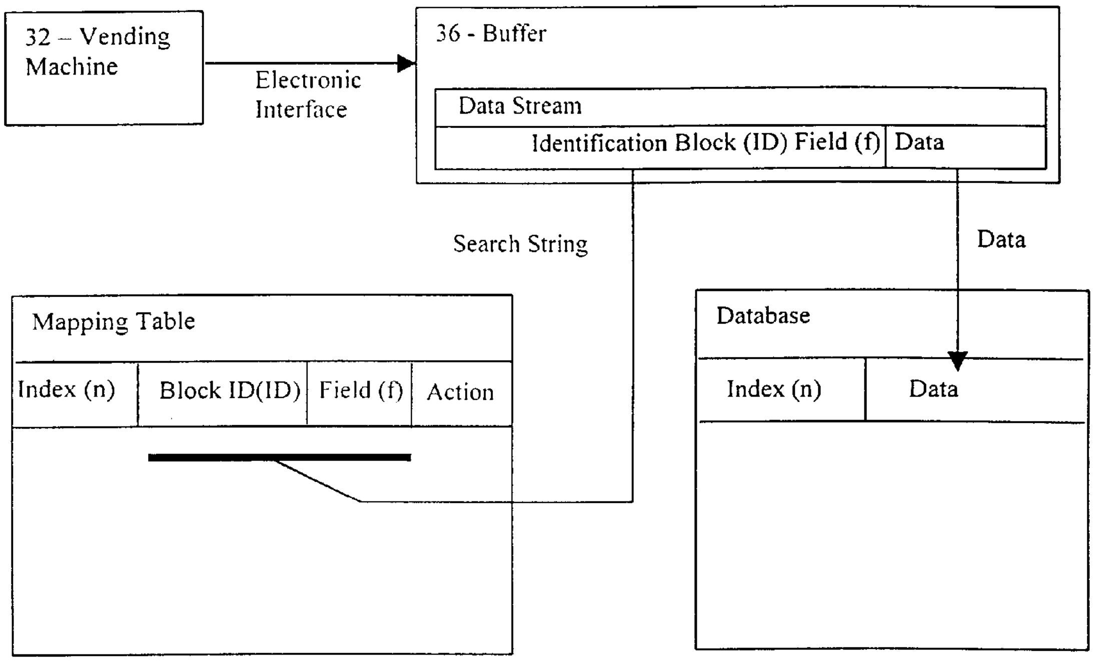
Figure 3B : Generic Information Parsing

| Reference | Classification |
|---|---|
| 1 | Product Database |
| 2 | Product Field Mapping Table |
| 3 | Product Mapping Table |
| 4 | Configuration Database |
| 5 | Vendor Asset Mapping Table |
| 6 | Vendor Asset Information Database |
| 7 | Cash Database |
| 8 | Cash Mapping Table |
| 9 | Error Custom Capture Mapping Table |
| 10 | Error/Custom Database |
| 11 | Errors Bit Field Mapping |
| 12 | Event Database Mapping Table |
| 13 | Events Database |
| 14 | Audit Module Information Database |
| 15 | Vendor Access Database |
| 16 | Stored Commands Table |
| 32 | Scheduled Queue |
| 33 | Product Tracking Queue |
| 34 | Errors and Exceptions Queue |

Figure 4 : Tables, Databases and Queues

High Nibble

| | |
|---|---|
| 0 | High Priority Alarm |
| 1 | Low Priority Alarm |

Low Nibble

| | |
|---|---|
| 0 | Replace Data. |
| 1 | Add to previous data. |
| 2 | Add the difference from the previous reading to the data. |
| 3 | Subtract from previous data. |
| 4 | Subtract the difference from the previous reading to the data. |

Figure 5 : Action Byte

Database Value: 4
Maximum Entries: 40

| Index | Information |
|---|---|
| 1 | Serial Number |
| 2 | Address |
| 3 | Host ID |
| 4 | Vendor ID |
| 5 | Telephone Number |
| 6 | Host Address |
| 7 | HW Config Flags |
| 8 | Event Enable Flags |
| 9 | Time Zone Offset |
| 10 | Entry Timeout |
| 11 | Door Ajar Timeout |
| 12 | Unterminated Session Timeout |
| 13 | Power Loss Timeout |
| 14 | Power Restored Timeout |
| 15 | No Sales Timeout |
| 16 | Service Delay |
| 17 | Exit Timeout |
| 18 | Health Switch Timeout |
| 19 | Data Summary Time |
| 20 | Report Time |
| 21 | Data Summary Interval |
| 22 | Report Interval |
| 23 | Special Vend Interval |
| 24 | Retry Delay |
| 25 | Product Tracking Queue Fill % |
| 26 | Scheduled Queue Fill % |
| 27 | Multiple Products Low |
| 28 | Multiple Products Critical |
| 29 | Exception Queue Fill % |
| 30 | Currency Base |
| 31 | Future Use |
| 32 | Future Use |
| 33 | Future Use |
| 34 | Future Use |
| 35 | Future Use |
| 36 | Future Use |
| 37 | Future Use |
| 38 | Future Use |
| 39 | Future Use |
| 40 | Future Use |

Figure 6 : Configuration Database

Database Value: 1
Maximum Entries: 120

| Field | Information |
|---|---|
| 1 | Price |
| 2 | Cumm. Inv. |
| 3 | Abs. Inv. |
| 4 | Sold Out |
| 5 | Dep. Calc. |
| 6 | CJ Alarm |
| 7 | Warn. Lvl. |
| 8 | Prod. Trkg. |
| 9 | Sold Out Alarm |
| 10 | Crit. Lvl. |

Figure 7 : Product Database

Database Value: 2
Maximum Entries: 4

| Field | Information |
|---|---|
| 1 | Block ID to Capture. |
| 2 | Field to Capture within the Block. |
| 3 | Action Byte |

Figure 8 : Product Field Mapping Table

Database Value: 3
Maximum Entries: 120

| Field | Information |
|---|---|
| 1 | Product Name |

Figure 9 : Product Mapping Table

Database Value: 7
Maximum Entries: 114

| Field | Information |
|---|---|
| 1 | Counter |

Figure 10 : Cash Database

Database Value: 8
Maximum Entries: 114

| Field | Information |
|---|---|
| 1 | Block ID to Capture. |
| 2 | Field to Capture within the Block. |
| 3 | Action Byte. |
| 4 | Array Reference. |

Figure 11 : Cash Mapping Database

Database Value: 6
Maximum Entries: 28

| Field | Information |
|---|---|
| 1 | ASCII String |

Figure 12 : Vendor Asset Information Database

Database Value: 5
Maximum Entries: 28

| Field | Information |
|---|---|
| 1 | Block ID to Capture. |
| 2 | Field to Capture within the Block. |
| 3 | Action Byte |

Figure 13 : Vendor Asset Mapping Table

Database Value: 15
Maximum Entries: 16

| Field | Information |
|---|---|
| 1 | Access Control PIN |

Figure 14 : Vendor Access Database

Database Value: 13
Maximum Entries: 40

| Field | Information |
|---|---|
| 1 | Counter |

Figure 15 : Events Database

Database Value: 12
Maximum Entries: 40

| Field | Information |
|---|---|
| 1 | Block ID to Capture. |
| 2 | Field to Capture within the Block. |
| 3 | Action Byte |

Figure 16 : Event Database Mapping Table

Database Value: 10
Maximum Length: 400 bytes

| Index | Value |
|---|---|
| 1 | Error Bit Field |
| 2 – End | Length of Data following (Byte) |

Figure 17 : Errors/Custom Database

Database Value: 9
Maximum Entries: 20

| Field | Information |
|---|---|
| 1 | Block ID to Capture. |
| 2 | Sub Block ID to Capture |
| 3 | Field to Capture within the Sub - Block. |
| 4 | Action Byte |

Figure 18 : Errors Custom Capture Mapping Table

Database Value: 11
Maximum Entries: 32

| Field | Information |
|---|---|
| 1 | Block ID to Capture. |
| 2 | Action Byte |

Figure 19 : Errors Bit Field Mapping Table

Database Value: 16
Maximum Entries: 16

| Field | Information |
|---|---|
| 1 | Stored Command Report Type |
| 2 | Date/Time |
| 3 | Command |

Figure 20A : Stored Command Table

| Value | Classification |
|---|---|
| 1 | Every Transmission |
| 2 | Standard Reporting |
| 3 | Error Event |
| 4 | Special Vend Event |
| 5 | Next Transmission |
| 6 | Date/time Triggered |

Figure 20B : Stored Command Report Types

Database Value: 33
Maximum Entries: 200

| Information |
|---|
| Product Dispensed Code |
| Product Index Vended |
| Time Stamp |

Figure 21 : Product Information Queue

Database Value: 34
Maximum Entries: 100

| Information |
|---|
| Error Entry Type |
| Index Number |
| Time Stamp |

Figure 22A : Errors and Exceptions Queue

| Value | Classification |
|---|---|
| 8 | Cash Database Map Entry |
| 9 | Errors Custom Capture Map Entry |
| 11 | Errors Bit Field Mapping Entry |
| 12 | Events Database Map Entry |
| 31 | Multiple Product Low Entry |
| 32 | Multiple Product Critical Entry |
| 33 | Product Overall Depletion Entry |
| 34 | Product Sold Out Entry |
| 35 | Product Column Jam Entry |
| 36 | Product Low Level Warning |
| 37 | Product Critical Level Warning |
| 38 | Scheduled Queue Warning |
| 39 | Product Tracking Queue Warning |
| 40 | Errors and Exception Queue Warning |

Figure 22B : Error Entry Types

| | | | | | |
|---|---|---|---|---|---|
| READ COMMAND: | 01 | 'Database' | 'Index' | 'Field' | |
| WRITE COMMAND: | 02 | 'Database' | 'Index' | 'Field' | 'Data' |
| CLEAR COMMAND: | 03 | 'Database' | 9F | 9F | |
| TIME STAMP COMMAND: | 04 | 'Seconds since 00:00:00 Jan. 1, 1970" | | | |
| PULL/PUSH COMMAND: | 05 | 'Queue' | 9F | 'Blank Byte' | |
Figure 23 : Command Formats
| | | | | |
|---|---|---|---|---|
| Header | Command/Response | Command/Response | Command/Response | Trailer |
Figure 24 : Data Transmission
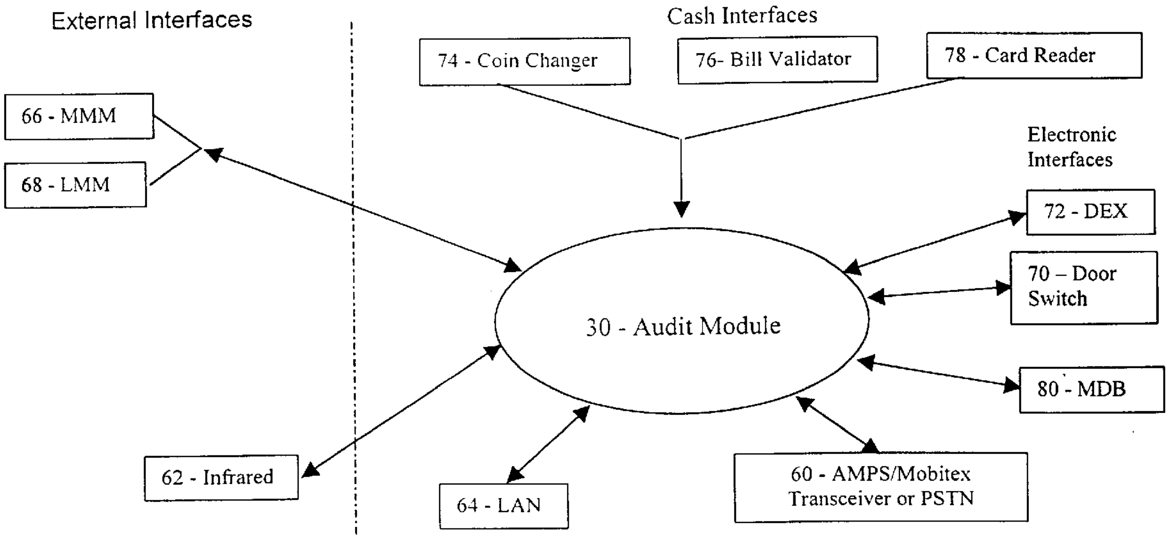
Figure 25 : Audit Module Interfaces

CONFIGURABLE VENDING MACHINE AUDIT MODULE

BACKGROUND

The present invention relates generally to the monitoring and reporting of vending machine data and, in particular, to a configurable vending machine audit module.

Various forms of monitoring and reporting systems are often associated with vending machines. Such systems can provide periodic monitoring and reporting of various events within the machines, such as inventory changes, maintenance requirements, service calls, cash receipts, demand for specific products, sold-out conditions, and various alarm conditions, among others.

Some monitoring and reporting systems include a central computer complex which receives data from multiple vending machines at remote locations. In such systems, a communication link is established between the central computer and the individual machines through the use, for example, of standard telephone lines or radio communications. At predetermined intervals, each vending machine accesses the communication link and calls the central computer. Once communication is established, the vending machine can transmit pertinent information about its status. Such systems can help eliminate unnecessary service calls and facilitate better supply route planning. The monitoring and reporting systems can lead to improved auditing practices as well as increased sales.

Generally, the vending machine and the central computer communicate using a predefined protocol which may include, for example, a series of fixed packets each of which is designed to contain a predetermined type of information. Such techniques can make it difficult to change the types of data that are reported by the vending machine because new software must be provided to the vending machine reporting unit to allow the desired data to be collected and reported. Accordingly, a technique which simplifies the process for configuring and reconfiguring a vending machine data monitoring and reporting unit so that different types of data can be collected and reported is desirable.

SUMMARY

In general, according to one aspect, a method of auditing data from a vending machine includes providing commands to an audit module connected to the vending machine. The commands are generated externally and indicate a type of vending machine data to be processed by the audit module, how the data is to be processed by the audit module, and a location in memory in the audit module for storage of that type of vending machine data. The method also includes configuring the audit module to process vending machine data in response to the received commands.

According to another aspect, an audit module arranged for connection to a vending machine includes a controller and memory. The audit module is configured to receive externally-generated commands indicating a type of vending machine data to be processed by the audit module, how the data is to be processed by the audit module, and a location in the audit module memory for storage of that type of vending machine data. The audit module is configured to process vending machine data based on the received commands.

Some implementations include one or more of the following features. The commands can be transmitted to the audit module from a remote host. The audit module can be configured, for example, to report vending machine data to the remote host based on the received commands. The audit module also can be configured to store at least one command which is to be executed by the audit module upon the occurrence of a specified event. Similarly, the audit module can be configured to store a stack of commands which are to be executed by the audit module upon the occurrence of one or more specified events.

The commands can specify vending machine data that is to be selectively retained for processing by the audit module. In addition, in response to one or more of the commands, a removably coupled device in the vending machine can be accessed. For example, the removably coupled device can be polled to retrieve information stored therein. Requested information can be transmitted from the audit module to a host. Accessing the removably coupled device can include updating, modifying or replacing software in the removably coupled device.

The audit module memory also can be reconfigured in response to received commands. Thus, operation of the audit module can be modified or changed. Reconfiguring the memory can cause the audit module to execute an operation with respect to vending machine data. In some implementations, each command has a syntax that includes variables whose values can be selected from among multiple options.

In various implementations, one or more of the following advantages may be present. The data to be monitored by the vending machine audit module and transmitted to the host can be changed dynamically without having to upgrade or modify the software code or replace a semiconductor chip in the audit module. A great amount of flexibility can, therefore, be provided with respect to monitoring and reporting vending machine data.

BRIEF DESCRIPTION OF THE DRAWINGS

FIG. 1 illustrates an audit system according to the invention.

FIG. 2 illustrates an audit module according to the invention.

FIGS. 3A and 3B illustrate an exemplary use of the command structure according to the invention.

FIG. 4 is a list of exemplary databases, tables and queues in the audit module and their corresponding values.

FIG. 5 illustrates the structure of an Action byte.

FIGS. 6–19, 20A–20B, 21 and 22A–22B illustrate the structure of various databases and tables in the audit module.

FIG. 23 illustrates the format of various commands for configuring and obtaining information from the audit module.

FIG. 24 illustrates a format for data transmissions from the audit module to a host.

FIG. 25 illustrates various interfaces for transferring data between the audit module, a host and vending machine components.

DETAILED DESCRIPTION

As shown in FIGS. 1 and 2, an audit module 30 is arranged for installation in and connection to a vending machine 32 to monitor events associated with the vending machine and to provide audit functions relating to the monitored activities. The audit module 30 can be used with various types of vending machines, and different interfaces are used to allow the audit module to monitor the signals associated with different machines.

The audit module 30 includes a controller 58 that operates according to a pre-loaded software program stored, for example, in non-volatile flash memory. The audit module, however, does not have a default configuration that represents a standard vending machine type. Rather, the audit module is configured for the particular environment within which it is to be used. The audit module can be configured by a remote host 34, such as a personal computer or a hand-held module, to store data obtained from the vending machine. The audit module 30 can report the contents of its databases to the host 34 upon request or at previously scheduled times. The audit module and the host can communicate, for example, using hardwired, infrared, optical, wireless or other techniques.

The configuration parameters for the particular vending machine 32 can be downloaded to the audit module 30 at the time of manufacture or upon installation into the vending machine. Moreover, the configuration of the audit module 30 can be modified subsequently by a vendor. The configuration parameters are initially received and verified, for example, in random access memory (RAM) in the audit module and subsequently are stored in flash memory.

The audit module 30 can be treated as a database manager which can be queried. A command language is used to manipulate data within database structures and to define other fixed structure information such as header data. The basic design of the database structure is to have mapping information stored in one set of database tables and the tracked values in separate databases. The index of a particular table references the corresponding index of the database. A data field that is not configured will not be monitored, and a request for a database location for which the corresponding mapping location has not been configured will result in an error.

When the audit module 30 is installed in a vending machine 32, vending machine data is received by a buffer 36 (FIG. 2) in the audit module. The audit module 30 then stores the received data in one of several databases depending on how the various databases have been configured. If the audit module 30 is not configured to store the received data in any of the databases, the data is discarded.

The audit module 30 includes several mapping tables which are used to determine whether and where received vending machine data is to be stored. The mapping tables define the information, if any, that is to be stored in each of the various databases. The mapping information is configurable at any time and determines the information stored in the corresponding database.

The host 34 communicates with the audit module 30 using a command language. The command language allows data stored in various audit module databases to be manipulated and certain fixed information to be defined. Exemplary commands include READ and WRITE, among others discussed below. The syntax for the commands includes defining the command, specifying the data structure to which the command applies, and specifying index and field references within the database or table.

To configure the audit module's databases and tables for operation, the host sends configuration information using, for example, the WRITE command. Configuration information can be directed to various mapping tables to initialize the database structures to store specified vending machine data.

For example, to track the total cash based on data received from the vending machine via an electronic interface 38, the general mapping structure shown in FIG. 3A can be used. Each type of data record received from the vending machine via the electronic interface is identified by a corresponding block identification (ID). For example, data following a specific block identification (ID) may correspond to cash data. Upon receiving a WRITE command, for example, the audit module 30 writes the specified block identification (ID) and field (f) into a specified index (n) of a particular mapping table. When data from the vending machine 32 subsequently is received via the electronic interface 38 and identified based on the identification block (ID), the audit module 30 searches all the mapping table entries for the identification block (ID). Based on the entry in the particular mapping table, data associated with the specified block identification (ID) and field (f) is stored by the audit module 30 in the specified index (n) of one of the databases (FIG. 3B).

The host 34 can use a READ command to retrieve information stored in the various databases and tables. The host can, therefore, retrieve vending machine data stored by the audit module as well as the configuration parameters currently stored in the various mapping tables and databases. The audit module 30 executes the received command and sends a response with the requested information to the host 34. Multiple information requests or responses can be included in a single transmission.

Databases and Mapping Tables

FIG. 4 is a list of various databases and tables and their corresponding values. Each database is configurable, except for the Configuration Database. The databases are formatted with the low byte first. An 'Action' byte is used to define how the data in a particular database will be processed. Exemplary 'Action' byte values and their associated actions are illustrated in FIG. 5. For example, an 'Action' byte may indicate that the new data is to be added to or subtracted from a previously stored value. In some cases, the new data may replace the previously stored value. The various databases and tables are discussed in greater detail below.

The Configuration Database 40 includes up to forty elements as indicated by FIG. 6. The Configuration Database is used to store configuration information about the vending machine and the audit module. Some entries are used to specify various timeout periods (e.g., power loss), to identify the coin and bill types and denominations handled by the vending machine, or to specify certain hardware configuration flags. A command for setting up the hardware configuration flags includes an identification of the type of interface to the vending machine. Receipt of such a command informs the audit module as to the type of interface over which it will receive the monitored signals and data from the vending machine and, in conjunction with support software stored in flash memory, allows the audit module to establish communication channels.

The Product Database 42 is defined as a 120 element database and allows tracking of data relating to individual product-types stored in the vending machine 32. Each element of the Product Database is defined by the structure shown in FIG. 7. The field 'Price' is a 16-bit unsigned integer and accepts configuration commands using values with an implied decimal place of 2. The field 'Cumm. Inv.' contains a running summation of vends for the product assigned to its position. This field is also an unsigned 16-bit field. The field 'Abs. Inv' holds the count of items to be vended from its position and is a countdown counter. The field 'Sold Out' contains an incremental count of the number of times the database element was selected and no product vended because the product was sold out. That counter is also an unsigned 16-bit integer.

The field 'Dep. Calc.' in the Product Database structure is a 1-bit flag field which can be set to cause the database element to be included in the calculation of over-all machine depletion levels. The field 'CJ Alarm' is a 1-bit flag field which can be set to instruct the audit module to generate an alarm when a column jam condition occurs for the associated product. The field 'Warn. Lvl.' is an unsigned 6-bit field which allows a warning level to be set for product depletion. The field 'Prod. Trkg.' is a 1-bit flag field which can be set to cause the audit module to track product vends for the database element in real time. The field 'Sold Out Alarm' is a 1-bit flag field which can be set to instruct the audit module to generate an alarm when a sold out condition occurs for the associated product. The field 'Crit. Lvl.' is an unsigned 6-bit field which can be used to set a critical level for product depletion.

Two mapping tables are associated with the Product Database 42: the Product Mapping Table 50 and the Product Field Mapping Table 52.

The Product Mapping Table 50 is a 120 element table used to map the product index to a product label. The database contains only one field (see FIG. 9). A product can be tracked and reported using a product label which consists of alphanumeric characters. For example, to monitor row 10, column 4 of a matrix vendor, the product label would be 'R10C04.'

The Product Field Mapping Table 52 is used to store search strings and actions associated with field data in the Product Database (see FIG. 8). The information is common across the entire Product Database, and the index number of this database corresponds to the field number of the Product Database. Alarm-enable bits in the 'Action' byte are ignored by the Product Field Mapping Table as product alarm enable bits are in the product database for each product index.

A Cash Database 44 includes approximately 114 32-bit elements, each of which is a counter or register. Some of the counters and registers can be configured, for example, to keep track of the number of coins and bills received or dispensed and to keep track of the number of sales. Some of the counters or registers are user-defined. The structure of each element in the Cash Database is illustrated in FIG. 10.

A Cash Mapping Table 54 is used to define which fields of the Cash Database will be used, the name that will be used to access a particular field, and how the contents of the field will be handled when accessed. The mapping structure, which is shown in FIG. 11, has an index associated with each index of the Cash Database 44. The 'Block ID' and 'Field' values reference the search strings and location within the information from the vendor. The 'Array Index' field references the data location if more than one instance of the data type exists for the same record structure. The 'Action' byte specifies the operation that should be performed on the data. Thus, for example, some records are repeated for each coin type. A '0' in the 'Array Index' field would indicate that the specified action is to be performed with respect to nickels and a '1' would indicate that the action is to performed with respect to dimes.

A Vendor Asset Information Database is used to capture asset information from the vendor. Each element of the Vender Asset Information database is represented by a single character index that is used both in setting up and retrieving data from the database.

A Vendor Asset Mapping Table is used to map configured database indices to the actual database field. In other words, it is used to store the Block ID and fields for the appropriate index location in the Vendor Asset Information Database. The table consists of twenty-eight elements, each of which has the structure shown in FIG. 13.

A Vendor Access Database contains personal identification numbers (PINs) for authorized users of the vending machine. The structure of the database is shown in FIG. 14.

Several databases and tables are associated with event and error information: (1) Events Database; (2) Event Database Mapping Table; and (3) Errors/Custom Database.

The Events Database 46 is a forty-element database, where each element is a counter. The structure of the database is illustrated in FIG. 15. Each element can be used to monitor various errors or other vending machine events, such as power outages, door openings and closings, etc.

The Events Database Mapping Table 56 is used to define which vendor events will be monitored. The 'Action' byte indicates how the field will be handled when processed, and whether the event being captured will be reported in real-time. The mapping structure has an element associated with each element of the Events Database. The structure of an element in the Events Database Mapping structure is shown in FIG. 16

The Errors/Custom Database is a two-part database, whose structure is illustrated in FIG. 17. The first part, at index 1, consists of one 32-bit, bit-addressable error field. The second part, starting at index 2, is a variable-length field for capturing data of unspecified length. The second part is, therefore, a dynamic self-defining structure whose form depends upon the data types being reported.

Two mapping tables are used to determine the contents of the Errors-Custom database: (1) Errors Custom Capture Mapping; and (2) Errors Bit Field Mapping.

The Errors Bit Field Mapping Table relates to index 1 of the Errors/Custom Database and contains thirty-two elements (see FIG. 19). Each contains the ASCII 'Block ID' of the bit being mapped and the 'Action'. The actual bit information is determined based upon the vending machine controller interface. The elements in the Errors Bit Field Mapping structure have a one-to-one correspondence with the 'Error Bit Field in the Errors/Custom Database. Index 1 serves as the most significant bit of the most significant word of the mapped field.

The Errors Custom Capture Mapping Table defines the DEX labels of the data being captured for storage in the second part of the Errors/Custom Database. The table is a twenty element structure whose elements are defined as shown in FIG. 18.

A Stored Commands Database contains a list of commands that can be run at a time specified by the user. The database contains sixteen elements having the structure shown in FIG. 20A. The 'Report Type' is defined as shown in FIG. 20B. The most significant bit of the 'Report Type' is used to specify whether a time stamp should be placed in the scheduled queue before the result. If the most significant bit is set, the time stamp is enabled. In one application, stored commands can be used to report vending machine data at a specified later time or upon the occurrence of a particular event, rather than at the time the command is sent to the audit module. Stored commands also can be used to configure a time change at a specified time well in advance of the required time.

The audit module 30 can use the following queues: (1) Scheduled Queue; (2) Product Tracking Queue; and (3) Errors and Exceptions Queue.

The Scheduled Queue is sent automatically at the scheduled report time or when the queue is filled to a specified capacity. The Scheduled Queue contains the responses to stored commands that are configured to be executed.

The Product Tracking Queue is used to store time stamped vend operations when product tracking is enabled. The queue includes up to two hundred vend events, each of which is six bytes long, as illustrated in FIG. 21.

The Errors and Exceptions Queue is used to store the time stamped errors that are configured as high or low priority The queue can store up to one hundred error events each of which is six bytes long, as shown in FIG. 22A. The queue is sent when a high priority alarm occurs and also can be sent on demand or when the queue is filled to a specified capacity. The field 'Error Type' is defined as shown in FIG. 22B.

Database Configuration and Data Retrieval

Database configuration and data retrieval are performed using pre-defined single byte commands. The available commands include the following: (1) READ; (2) WRITE; (3) CLEAR; (4) TIME STAMP; and (5) PULL/PUSH. The format and syntax for each of the commands is illustrated in FIG. 23.

READ Commands

A READ command instructs the audit module to read the requested information and send the results. The parameters of the READ command include the index to be read and the field within that index. The READ command can specify a field within an index or the field across the entire index. The syntax for a READ command is:

01 'Database' 'Index' 'Field' where the 'Database' field refers to the value of one of the databases or mapping tables.

To request information across more than one field, one of the indices 8F, 9F or AF is used. The 8F and 9F indices are used to request the response without the reference attached to the data. The AF index is used to request the response with the reference attached to the data. When the indices 8F, 9F or AF are used, the response includes a byte immediately following the 8F, 9F or AF to indicate how many instances of the data follow. The 8F index is used for selective READ operations and is followed by a byte indicating the number of indices to be read. The 9F index refers to all information without index references. The AF index refers to all information with index references. 9F references are used for field queries to indicate the entire record is required. In this case the data is returned in structure format with all information packed.

Several examples are now discussed to illustrate READ commands using the format of FIG. 23. To read the absolute inventory from index 2 of the Product Database, the syntax for the READ command would be 01 02 03, where the value of the Product Database is 1 (see FIG. 4) and the absolute inventory is field 3. Assuming index 2 of the absolute inventory field of the Product Database contains the value of 33 (i.e., 0x21), then the response would be 81 01 02 03 00 21 with the response command byte now set to 81.

To read the number of vends for all entries in the Product Database (without supporting index information), the READ command 01 01 9F 02 can be used, assuming that the number of vends is stored in field 2 of the Product Database. Assuming further that the Product Database has four configured indices, the format of the response would look like 81 01 9F 04 02 00 20 00 34 00 21 00 07. The response has the value of 4 inserted between the 9F and field number 2 to indicate that the response includes four repetitions of the requested field attached.

On the other hand, to read the number of vends for all entries of the Product Database (with supporting index information), a READ command having the syntax 01 01 AF 02 would be used. The format of the response would look like the following: 81 01 AF 04 02 01 00 20 05 00 34 06 00 21 07 00 07. As before, the value of 4 inserted between AF and the field number 2 indicates there are four repetitions of the requested field attached. Each repetition reported includes the index number for which the value applies because supporting information was requested.

To read the absolute inventory for the selected indices 1, 3, 8 and 9 from the Product Database, a READ command with the syntax 01 01 8 F 04 03 01 03 08 09 can be used. The number 4 follows 8F in the foregoing command to indicate that the command includes a request for data from four indices in the absolute inventory field 3. The format of the response would look like: 81 01 8F 04 03 00 01 00 02 00 03 00 04.

The READ command can be used to read data stored in other databases and tables as well.

WRITE Commands

A WRITE command can be used to program fields and indices in the various databases and mapping tables. The syntax for a WRITE command is 02 'Database' 'Index' 'Field' where the 'Database' field is the value of one of the databases or mapping tables. In some cases, use of the WRITE command may be prevented with respect to one or more fields within a database. A WRITE command directed to a protected location will result in a negative acknowledgement (NAK). After a WRITE command has been completed, the audit module responds with a positive acknowledgment (ACK) or a negative acknowledgement (NAK) depending on whether the command was successful. The ACK and NAK are included in bit 6 of a response to a WRITE command byte.

Complete record structures can be written to a database using the 9F index. The structures are packed. The AF index can be used to write index specific information to a database. Examples of WRITE commands are now discussed.

To write the value 31 (i.e., 0x1F) to index 2 of the absolute inventory field of the Product Database, a WRITE command with the syntax 02 01 02 03 1F can be used, where the Product Database has the value 1, and the absolute inventory is field 3 of that database. If the write operation is successful, then the response would be 82 01 04 03. If, on the other hand, the write operation were not successful, then the response would be C2 01 04 03.

To write the values 31 (0x1F), 46 (0x2E) and 4 to the first 3 entries in the Cash Database, a WRITE command 02 07 9F 03 01 1F 00 2E 00 04 00 would be used, where the value of the Cash Database is 7, and the index 9F is used in a manner analogous to that described above in the section on read commands. If the write operation is successful, the response would be 82 07 9F 03 01. On other hand, if the write operation were not successful, the response would be 02 07 9F 03 01, indicating that the data was not written to the requested locations.

Similarly, to write the values 1F, 2E and 04 to the Cash Database indices 2, 5, and 9 respectively, the WRITE command 02 07 AF 03 01 02 1F 00 05 2E 00 09 04 00 would be used, where the AF index is described above. If the write operation is successful, then the response would be 82 07 AF 03 01, whereas if the write operation failed, then the response would be C2 07 AF 03 01.

The WRITE command can be used to write data to other databases and tables as well.

CLEAR, TIME STAMP and Queue PULL/PUSH Commands

The CLEAR command is used to set all entries of a database to zero. The general syntax for the CLEAR command is illustrated in FIG. 23. For example, to clear the Product Database, the CLEAR command 03 01 9F 9F would be used. If the clear operation is successful, then the response 83 01 9F 9F would be received. Otherwise, the response C3 01 9F 9F would be received to indicate that the clear operation failed. To selectively clear fields, the WRITE command should be used to write zeros in the selected fields and indices.

The TIME STAMP command is used to indicate the time that data was written to a queue. A time stamp is generated when stored commands that have the most significant bit of the 'Report Type' set are executed. The date and time are provided as a 4-byte number following the 04 command reference as shown in FIG. 23.

The queue PULL/PUSH command is used to request data from a queue or to indicate that data is sent from a queue. If data from a queue is sent automatically, the information is pushed from the audit module 30 to the host 34. The format of the queue command is illustrated in FIG. 23, where the 'Blank byte' indicates either the number of entries or the length of the queue. The Product Tracking and Error and Exceptions queues are returned with the number of entries in the queue. The scheduled queue is sent with the length of the queue.

When a queue is pushed either by a report time or high priority error, only the particular queue is sent. The host 34 can access other queues by using a queue pull command. If the queue is empty the response will indicate a length or number of entries of 0.

Data Transmissions

A transmission can be defined as the collection of data within one communications session and is based on the command/formatting language described above. The format of the message protocol is illustrated in FIG. 24. Multiple commands to perform operations on the same database structures are sequential within each transmission with a maximum of 1024 bytes for all forms of incoming commands to the audit module 30. Transmissions of outgoing commands from the audit module 30 can have up to 4096 bytes. The header and trailer are determined by the location within the transmission. The header starts at the first byte of a transmission. The trailer forms the last two bytes of a transmission and is a 16-bit CRC calculated over the entire transmission including the header.

As shown in FIG. 25, in some implementations the audit module 30 can communicate with a host via an interface 60 configured for AMPS cellular, Mobitex or PSTN communications. An interface 62 for infrared communications also can be provided. A local access network (LAN) 64 can be used to allow multiple audit modules to share a single transceiver, thereby reducing the total number of transceivers.

When installed in the vending machine, the audit module 30 may receive data from one or more units or components in the vending machine. For example, the audit module can monitor data from a coin changer 74, bill validator 76 and/or debit card reader 78, as well as the vending machine controller. In some applications, the audit module 30 can be connected to an external adapter, such as a matrix motor monitor (MMM) 66 or a linear motor monitor (LMM) 68, to allow the audit module to track product information in a matrix or linear vending machine. The audit module also can be configured to receive signals from a door switch 70 to determine whether the vending machine door is open or closed.

A direct connect interface 72, based on the DEX/UCS standard, is provided to link the audit module 30 and another vending machine device directly together for transferring vending audit type data. The medium for the transfer is based upon the DEX/UCS fixed communications protocol and physical interface. The physical layer for DEX communications involves a standard RS232C interface.

In addition to the DEX interface 72, the audit module 30 can include a multi-drop bus (MDB) interface 80 which removably couples the audit module 30 to one or more vending machine devices. The command language discussed above can be used to access a device removably coupled to the audit module. Such devices include a vending machine control board, a coin changer or bill validator, among others. The audit module can be configured, for example, to poll the removably coupled device and request that software or data stored in the removably coupled device be sent to the audit module which can transfer the requested information to the requesting host. Similarly, commands can be sent to the audit module to update, modify or replace software in the removably coupled device.

Although specific database, table, command and transmission formats have been set forth in the foregoing description, they are exemplary only. Other formats can be used and other implementations are within the scope of the following claims.

What is claimed is:

1. A method of auditing data from a vending machine, the method comprising:

providing commands to an audit module connected to the vending machine, wherein the commands are generated externally and indicate a type of vending machine data to be processed by the audit module, how the data is to be processed by the audit module, and a location in memory in the audit module for storage of that type of vending machine data;

configuring the audit module to process vending machine data in response to the received commands; and using one or more configurable mapping tables in the audit module to determine whether and where received vending machine data is to be stored.

2. The method of claim 1 wherein the commands are transmitted to the audit module from a remote host.

3. The method of claim 1 including:

configuring the audit module to report vending machine data to a remote host based on the received commands.

4. The method of claim 1 including:

configuring the audit module to store at least one command which is to be executed by the audit module upon the occurrence of a specified event.

5. The method of claim 1 including:

configuring the audit module to store a stack of commands which are to be executed by the audit module upon the occurrence of one or more specified events.

6. The method of claim 1 wherein the commands specify vending machine data that is to be selectively retained for processing by the audit module.

7. The method of claim 1 including:

accessing a removably coupled device in the vending machine in response to one or more of the commands.

8. The method of claim 7 wherein the act of accessing a removably coupled device includes polling the device to retrieve information stored in the removably coupled device.

9. The method of claim 8 further including:

transferring the requested information from the audit module to a host.

10. The method of claim 7 wherein the act of accessing a removably coupled device includes updating, modifying or replacing software in the removably coupled device.

11. The method of claim 1 further including:

reconfiguring at least a portion of memory in the audit module in response to received commands.

12. The method of claim 11 wherein the act of reconfiguring modifies operation of the audit module.

13. The method of claim 1 wherein each command has a syntax that includes variables whose values can be selected from a plurality of options.

14. An audit module arranged for connection to a vending machine, the audit module comprising:

a controller and memory, wherein the audit module is configured to receive externally-generated commands indicating a type of vending machine data to be processed by the audit module, how the data is to be processed by the audit module, and a location in the audit module memory for storage of that type of vending machine data, and wherein the audit module is configured to process vending machine data based on the received commands, the audit module including one or more configurable mapping tables for determining whether and where received vending machine data is to be stored.

15. The audit module of claim 14 configured to receive the commands from a remote host.

16. The audit module of claim 14 that can be configured in response to received commands to report vending machine data to a remote host.

17. The audit module of claim 14 wherein the audit module can store at least one received command to be executed by the audit module upon the occurrence of a specified event.

18. The audit module of claim 14 wherein the audit module can be configured to store a stack of commands which are to be executed by the audit module upon the occurrence of one or more specified events.

19. The audit module of claim 14 wherein the audit module can be configured to selectively retain specified vending machine data for subsequent processing in response to the received commands.

20. The audit module of claim 14 wherein the audit module can be configured to access a removably coupled device in the vending machine in response to one or more of the received commands.

21. The audit module of claim 20 wherein the audit module can be configured, in response to the received commands, to poll the removably coupled device to retrieve information stored therein.

22. The audit module of claim 21 wherein the audit module can be configured, in response to the received commands, to transfer requested information to a remote host.

23. The audit module of claim 20 wherein the audit module memory can be reconfirmed in response to the received commands.

24. The audit module of claim 14 wherein each command has a syntax that includes variables whose values are selected from a plurality of options.

25. A vending machine comprising:

an audit module, wherein the audit module includes a controller and memory, and wherein the audit module is configured to receive externally-generated commands indicating a type of vending machine data to be processed by the audit module, how the data is to be processed by the audit module, and a location in the audit module memory for storage of that type of vending machine data, and wherein the audit module is configured to process vending machine data based on the received commands, the audit module including one or more configurable mapping tables for determining whether and where received vending machine data is to be stored.

* * * * *

UNITED STATES PATENT AND TRADEMARK OFFICE

CERTIFICATE OF CORRECTION

PATENT NO. : 6,339,731 B1 Page 1 of 1
DATED : January 15, 2002
INVENTOR(S) : Matthew P. Morris and Patrick J. McGarry It is certified that error appears in the above-identified patent and that said Letters Patent is hereby corrected as shown below:

Title page,
Item [22], insert:
-- [60] Related U.S. Application Data
Provisional application No. 60/099,795, filed on September 10, 1998. --

Column 1,
Line 3, immediately following the Title, insert:
-- CROSS REFERENCE TO RELATED APPLICATIONS
This application claims the priority of U.S. Provisional Application No. 60/099,795, filed September 10, 1998. --

Signed and Sealed this

Twenty-seventh Day of August, 2002

*Attest:*

JAMES E. ROGAN

*Attesting Officer* *Director of the United States Patent and Trademark Office*